UNITED STATES PATENT OFFICE.

PETER T. AUSTEN AND FREDERICK J. MAYWALD, OF NEW YORK, N. Y.

PAINT-REMOVER AND PROCESS OF MAKING THE SAME.

No. 846,080.

Specification of Letters Patent.

Patented March 5, 1907.

Application filed November 26, 1906. Serial No. 345,165.

*To all whom it may concern:*

Be it known that we, PETER T. AUSTEN, a citizen of the United States, residing in the city of New York, borough of Manhattan, county of New York, and State of New York, and FREDERICK J. MAYWALD, a citizen of the United States, residing in the city of New York, borough of Brooklyn, county of Kings, and State of New York, have invented a certain new and useful Paint-Remover and Process of Making the Same; and we do hereby declare the following to be a full, clear, and exact description of the same, such as will enable others skilled in the art to which it appertains to make and use the same.

This invention relates to paint-removers and processes of making the same, and consists in a paint and varnish remover comprising an aqueous solution carrying suspended therein in a finely-divided state various volatile solvents or mixtures of the same adapted to soften and remove paint and varnish, and in the process of making such a remover, all as more fully hereinafter set forth and as claimed.

Most modern types of paint and varnish removers contain and depend for their action upon certain neutral volatile solvents—such as alcohol, wood spirit, acetone, benzol, benzine, various light tar-oils, and the like. Older types of removers containing caustic alkali or other powerful chemicals in practice have proved unsatisfactory as being injurious both to the surface from which the paint or varnish is to be removed and to the operator's hands. Such removers are no longer generally employed. Volatile solvents such as described of course evaporate quickly in the air when spread in thin layers on painted surfaces and are moreover so thinly liquid that they flow off vertical or inclined surfaces. For this reason in the modern removers employing volatile solvents more or less wax or grease is usually incorporated, partly to thicken them somewhat and better adapt them to remain on non-horizontal surfaces, partly to furnish an evaporation-retarding superficial scum, and partly to retard evaporation by lessening the vapor tension of these volatile solvents. Nearly all the volatile solvents in use for removing paint and varnish are bodies of relatively high vapor tension; but in the described mixture the presence of the wax or grease in solution or suspension, or both, tends to cut down this vapor tension materially. In these thickened removers there is frequently enough of the wax or grease to render the body of admixed volatile solvents rather thick, and as the paint and varnish constituents which it dissolves in use are not freely diffusible the activity of such a body is, as a rule, confined to the layer of remover in actual contact with the varnish which is being dissolved. Volatile solvents being all relatively expensive, this is evidently uneconomical. Further, old paint and varnish being as a rule rather dirty, wetting of its surface by such removers is not as quick and thorough as is desirable, the admixed greasy or waxy matter tending to restrain wetting. Of course the wax or grease in solution in the volatile solvents diminishes materially the capacity of such volatile solvents for dissolving paint and varnish constituents.

In the present invention we have devised a new type of paint and varnish remover and a process of preparing the same. Instead of restraining evaporation of volatile solvents by the chemical and physical action of waxy or greasy matter we restrain evaporation in another manner. The volatile solvent or mixture of solvents is finely subdivided and each minute droplet is given a watery jacketing-coating. This we accomplish by beating up or otherwise emulsifying the volatile solvents with an aqueous carrier, thereby forming an emulsion. The aqueous carrier may be a water solution of any substance having the power of producing a permanent watery emulsion with immiscible solvents, and preferably this substance is of an albumenoid or proteid nature.

Proteids and other bodies capable of producing permanent emulsions of hydrocarbons and like bodies with water do not, as a rule, dissolve in such bodies or in the volatile solvents used in paint-removers, and solvents emulsified by proteid solutions retain their full solvent capacity. The aqueous layer which surrounds each individual droplet of the volatile solvent prevents its contact with air, and therefore prevents evaporation. It does not, however, prevent its contact with paint or varnished surfaces. The same power of thoroughly wetting oily bodies which enable such an aqueous solution to emulsify volatile solvents, many of which are hydrocarbons and more or less oily in nature, are insoluble in water and are not wetted by pure water, enables it also to wet thoroughly a painted or varnished surface and to penetrate the same effectually. By reason of surface tension phenomena an albumenoid solution which of itself may be quite fluid and the various volatile solvents most of which are very mobile when emulsified together produce a mixture which, while liquid and flowable and not ordinarily thicker than rich milk or cream, has a considerable degree of consistence, and which is well adapted to remain on vertical or inclined surfaces. There is, however, in such a body of emulsion considerable internal movement of the suspended droplets of volatile solvent in the milky or creamy thickness usually employed, and the painted surface to be cleaned is continually exposed to the attack of fresh droplets of the solvent.

The aqueous carrier used may be a water solution of any body having the power of forming a permanent emulsion with water-immiscible solvents, such as are most of the common paint and varnish solvents. Serum albumen, commercial egg albumen, or even gelatin do very well. Solutions of any of these proteids are improved for this purpose by the presence of the colloidal carbohydrates, such as those found in Irish moss or agar-agar. "Chinese gelatin," which is nearly related to agar-agar, is quite suitable. Alkaline caseinates which in water solution have some paint-softening power, particularly in the case of ammonium caseinate, are best used in connection with these colloidal carbohydrates. A mixed solution of ammonium caseinate and Chinese gelatin forms a very good aqueous emulsifier for this purpose. As stated, ammonium caseinate itself acts on paint and varnish; but it is not caustic and is not injurious to the hands of an operator, as was the case with the older types of paint-remover in which caustic alkalies were used. No caustic alkalies, caustic substances like phenol, or other corrosive bodies are used in the present remover, and it is also free of free acids.

For the volatile-solvent component of the remover any of the well-known volatile solvents usually employed in removing paint and varnish may be here used—as, for instance, benzol, benzine, "methyl acetone," acetone, methyl alcohol, ethyl alcohol, fusel-oil, ethyl acetate, methyl acetate, toluol, xylol, acetone-oils, tar-oils, wood-tar oils, rosin-oil, rosin spirit, dichlorhydrin, epichlorhydrin, carbon tetrachlorid, chloroform, deodorized carbon bisulfid, turpentine, and the like.

Any or all of the above-named solvents may be employed in connection with the described emulsifying aqueous carriers, the particular choice of such solvent depending upon the type of paint or varnish on which the remover is to be employed. While in older types of paint-removers, consisting of a mixture of solvents containing more or less wax or grease, it was necessary that these solvents be mutually miscible, this necessity does not exist with the present remover. In such older paint-removers alcoholic bodies are generally used as one component and not being miscible with most petroleum hydrocarbons employment of the latter in the removers was precluded. In the present remover, however, petroleum hydrocarbons, which have many desirable properties adapting them for use in paint-removers, may be freely employed. Petroleum hydrocarbons being relatively cheap, such employment materially cheapens the cost of the remover.

For general purposes it is usually desirable to have several volatile solvents of varying characteristics in the remover. A useful remover for general purposes may be made by emulsifying methyl alcohol, 62°, benzine, benzol, and acetone with a compound emulsifier containing ammonium caseinate and Chinese gelatin. For this purpose an ammoniacal solution of casein is made by dissolving eighty grams of commercial casein in seventy-five grams of 26° water of ammonia and one hundred and forty-five grams of water—three hundred grams in all. Fifty grams of this solution are mixed with fifty grams of a five-per-cent. aqueous solution of Chinese gelatin. With the one hundred grams of aqueous emulsifier so formed are thoroughly admixed and emulsified forty grams of methyl alcohol, forty grams of 62° benzene, eighty grams of benzol, and eighty grams of acetone. These volatile solvents may be first mixed and then emulsified with the emulsifier, or they may be added successively during emulsification. Another mixture of general application may be made from the same quantities of the same solvents thoroughly emulsified with one hundred grams of ten-per-cent. serum or egg-albumen solution or with one hundred grams of a five-per-cent. gelatin solution. More or less of a colloidal carbohydrate—such as agar-agar, Irish moss, or Chinese gelatin—may be advantageously used in connection with any of these proteid solutions as contributing to the permanency of the emulsions formed with volatile solvents.

Proteid solutions have a peculiar relation to oily and other water-immiscible fluids, tending to mix with them in rather definite proportions. This is particularly true of casein solutions, and in the use of the ammoniacal-casein solution mentioned on standing the emulsion will generally be found to reject a portion of its water and ammonia, which separate as an underlying layer when light volatile solvents have been employed. This separated layer is withdrawn before packaging the emulsified remover.

A good remover for many purposes may be made by emulsifying two hundred and forty grams of a mixture of benzol and ordinary wood spirit with one hundred grams of any of the aqueous carriers described. Half or more of the benzol may be replaced by gasolene or benzine.

In the described remover it is desirable that the consistence be about that of rich milk or cream, as is the case with the specific examples with specific proportions given as permitting ready application to surfaces to be cleaned, making the remover liquid and flowable without making it so mobile as to tend to run off. Such a consistence is given by the stated proportions, an emulsion being produced which is liquid and flowable, but as a body not mobile, though consisting of mobile components and though having the described internal mobility which permits full utilization of the solvent power of the contained droplets of solvent. It is of course desirable to have as much solvent present as possible; but the amount must not be so large as to render the composition too stiff and immobile. As in the examples cited, however, the amount of volatile solvents employed can be more than half the total mixture without making the consistence injuriously stiff.

What we claim is—

1. A paint-remover comprising a fluid emulsion of a mixture of a plurality of volatile solvents of differing chemical character and having substantially unimpaired solvent power in an aqueous carrier, said emulsion being creamy in character, fluid and flowable, free from caustic or corrosive components or free acids and consisting in greater part of said volatile solvents.

2. A paint-remover comprising a fluid emulsion of a mixture of a plurality of volatile solvents of differing chemical character in an aqueous carrier containing a dissolved proteid body, said emulsion being creamy in character, fluid and flowable, free from caustic or corrosive components or free acids and consisting in greater part of said volatile solvents.

3. A paint-remover comprising a fluid emulsion of a mixture of a plurality of volatile solvents of differing chemical character in an aqueous carrier containing a dissolved proteid body and a colloidal carbohydrate, said emulsion being creamy in character, fluid and flowable, free from caustic components and consisting in greater part of said volatile solvents.

4. A paint-remover comprising a fluid emulsion of a mixture of a plurality of volatile solvents of differing chemical character in an aqueous carrier containing a dissolved caseinate, said emulsion being creamy in character, fluid and flowable, free from caustic components and consisting in greater part of said volatile solvents.

5. A paint-remover comprising a fluid emulsion of a plurality of volatile solvents of differing chemical character in an aqueous carrier containing dissolved ammonium caseinate, said emulsion being creamy in character, flowable, free from caustic components and consisting in greater part of said volatile solvents.

6. A paint-remover comprising a fluid emulsion of a mixture of volatile solvents in an aqueous carrier containing a dissolved caseinate and a colloidal carbohydrate, said emulsion being creamy and flowable.

7. A paint-remover comprising a fluid emulsion of a mixture of volatile solvents in an aqueous carrier containing dissolved ammonium caseinate and a colloidal carbohydrate, said emulsion being creamy and flowable.

8. A paint-remover comprising a fluid emulsion of a mixture of volatile solvents in an aqueous carrier containing dissolved ammonium caseinate and Chinese gelatin.

9. A paint-remover comprising a fluid emulsion of a mixture of a plurality of volatile solvents of differing chemical character but comprising a petroleum hydrocarbon, and having substantially unimpaired solvent power in an aqueous carrier, said emulsion being creamy in character, flowable, free from caustic or corrosive components or free acids and consisting in greater part of said volatile solvents.

10. The process of making a paint-remover which consists in mixing a plurality of differing volatile solvents having substantially unimpaired solvent power and emulsifying such mixture in an alkaline aqueous carrier in such proportions as to make a fluid creamy emulsion consisting in greater part of said volatile solvents.

11. The process of making a paint-remover which consists in mixing a plurality of differing volatile solvents having substantially unimpaired solvent power and emulsifying such mixture in an alkaline aqueous carrier containing a dissolved proteid body in such proportions as to make a fluid creamy emulsion consisting in greater part of said volatile solvents.

12. The process of making a paint-remover which consists in mixing a plurality of differing volatile solvents and emulsifying the mixture in an aqueous carrier containing a dissolved caseinate in such proportions as to make a fluid creamy emulsion consisting in greater part of said volatile solvents.

13. The process of making a paint-remover which consists in mixing a plurality of differing volatile solvents and emulsifying the mixture in an aqueous carrier containing dissolved caseinate of ammonium, in such proportions as to make a fluid creamy emulsion consisting in greater part of said volatile solvents.

14. The process of making a paint-remover which consists in mixing a plurality of differing volatile solvents and emulsifying the mixture in an aqueous carrier containing a dissolved proteid and a colloidal carbohydrate in such proportions as to make a fluid creamy emulsion consisting in greater part of said volatile solvents.

In testimony whereof we affix our signatures in the presence of two witnesses.

PETER T. AUSTEN.
FREDERICK J. MAYWALD.

Witnesses:
H. M. MARBLE,
ROGER H. LYON.